(12) United States Patent
Simonsen (10) Patent No.: US 11,939,750 B2
(45) Date of Patent: Mar. 26, 2024

(54) ADAPTER CAP FOR A FIRE HYDRANT, A FIRE HYDRANT AND A METHOD FOR REMOTE MONITORING AN OPEN-CLOSE STATUS OF A FIRE HYDRANT

(71) Applicant: AVK Holding A/S, Galten (DK)

(72) Inventor: Christian Henrik Simonsen, Ulstrup (DK)

(73) Assignee: AVK HOLDING A/S, Galten (DK)

(*) Notice: Subject to any disclaimer, the term of this patent is extended or adjusted under 35 U.S.C. 154(b) by 0 days.

(21) Appl. No.: 17/801,549

(22) PCT Filed: Feb. 3, 2021

(86) PCT No.: PCT/DK2021/050033
§ 371 (c)(1),
(2) Date: Aug. 23, 2022

(87) PCT Pub. No.: WO2021/170187
PCT Pub. Date: Sep. 2, 2021

(65) Prior Publication Data
US 2023/0133256 A1    May 4, 2023

(30) Foreign Application Priority Data
Feb. 24, 2020    (DK) .......................... PA 2020 70119

(51) Int. Cl.
*E03B 9/06*    (2006.01)
*F16K 35/10*    (2006.01)
*F16K 37/00*    (2006.01)

(52) U.S. Cl.
CPC ............ *E03B 9/06* (2013.01); *F16K 37/0033* (2013.01); *Y10T 137/5468* (2015.04); *Y10T 137/8242* (2015.04); *Y10T 137/8275* (2015.04)

(58) Field of Classification Search
CPC ..... E03B 9/00; E03B 9/02; E03B 9/04; E03B 9/06; F16K 35/10; F16K 37/0033;
(Continued)

(56) References Cited

U.S. PATENT DOCUMENTS 4,967,792 A * 11/1990 Magee ................ F16K 37/0041
137/554
5,931,177 A    8/1999 Yonnet
(Continued)

FOREIGN PATENT DOCUMENTS

CN    206667368 U    11/2017
CN    107819985 A    3/2018
(Continued)

OTHER PUBLICATIONS

International Search Report for corresponding application for PCT/DK2021/050033 filed Feb. 3, 2021, dated Jun. 10, 2021.
(Continued)

*Primary Examiner* — Kevin F Murphy
*Assistant Examiner* — Jonathan J Waddy
(74) *Attorney, Agent, or Firm* — CANTOR COLBURN LLP (57) ABSTRACT

An adapter cap for a fire hydrant including a hydrant actuation nut by means of which the hydrant is opened and closed by rotating the hydrant actuation nut, where the adapter cap includes a cap housing having connection means for connecting the adapter cap to the hydrant actuation nut, the cap housing having a cap actuation nut by which the adapter cap may be engaged and the cap housing including a skirt part arranged to encircle at least a part of the connection means, where a connection means centre axis of the connection means and a cap actuation nut centre axis of the cap actuation nut are arranged coaxially, where the connection means and the cap actuation nut are made from
(Continued)

metal, and where at least a part of the skirt part is made from a polymer material, the adapter cap further includes at least one sensor arranged in the cap housing, where the at least one sensor is arranged to detect at least one operational parameter of the hydrant, and wireless communication means arranged in the cap housing for communicating the at least one operational parameter wirelessly to an external data system.

18 Claims, 5 Drawing Sheets

(58) Field of Classification Search
CPC ............ F16K 27/006; Y10T 137/5468; Y10T 137/8242; Y10T 137/8275
USPC .... 137/15.02, 286, 292, 293, 296, 553, 554, 137/556
See application file for complete search history.

(56) References Cited

U.S. PATENT DOCUMENTS

| | | | |
|---|---|---|---|
| 7,980,317 B1 | 6/2011 | Preta | |
| 8,353,309 B1* | 1/2013 | Embry | A62C 35/20 |
| | | | 70/164 |
| 8,657,021 B1 | 2/2014 | Preta | |
| 2002/0134437 A1* | 9/2002 | Affaticati | F16K 37/0033 |
| | | | 137/554 |
| 2010/0276009 A1* | 11/2010 | Wilber | F16K 35/10 |
| | | | 137/296 |
| 2011/0205055 A1* | 8/2011 | Smaidris | F16K 37/0091 |
| | | | 340/539.1 |
| 2011/0308638 A1 | 12/2011 | Hyland | |
| 2013/0314239 A1* | 11/2013 | Clark | E03B 7/08 |
| | | | 340/686.1 |
| 2014/0373941 A1* | 12/2014 | Varman | F16K 35/10 |
| | | | 137/296 |
| 2016/0001114 A1 | 1/2016 | Hyland | |
| 2017/0232285 A1* | 8/2017 | Magee | F16K 1/221 |
| | | | 137/554 |

FOREIGN PATENT DOCUMENTS

| | | |
|---|---|---|
| CN | 208415380 U | 1/2019 |
| CN | 109966686 A | 7/2019 |
| CN | 209130275 U | 7/2019 |
| CN | 209137836 U | 7/2019 |
| KR | 20060017275 A | 2/2006 |
| WO | 2013038404 A1 | 3/2013 |
| WO | 2016012674 A1 | 1/2016 |

OTHER PUBLICATIONS

Written Opinion for corresponding application for PCT/DK2021/050033 filed Feb. 3, 2021, dated Jun. 10, 2021.

* cited by examiner

ADAPTER CAP FOR A FIRE HYDRANT, A FIRE HYDRANT AND A METHOD FOR REMOTE MONITORING AN OPEN-CLOSE STATUS OF A FIRE HYDRANT

TECHNICAL FIELD

The disclosure relates to an adapter cap for a fire hydrant comprising a hydrant actuation nut by means of which the fire hydrant is opened and closed by rotating the hydrant actuation nut. The disclosure also relates to an adapter cap kit, a fire hydrant, a method for remote monitoring of an open-close status of a fire hydrant, method for determining a position of a blocking element in a fire hydrant comprising a hydrant actuation nut configured so that the blocking element moves between an open and a closed position in dependency of the direction in which the hydrant actuation nut is rotated.

BACKGROUND

Fire hydrants are scattered in large numbers over a large area and to protect against unauthorized opening of the hydrants, to detect opening time of hydrants to estimate water usage and other it is desired to keep track of if hydrants are opened and for how long.

Thus, from American U.S. Pat. No. 7,980,317 B1 it is known to provide a hydrant with a monitor module for connecting to the operating nut of the hydrant, wherein the monitor module is provided with a transmitter configured to generate an RF signal. However, this monitor module is complex and inefficient.

The disclosure provides for an advantageous technique for remote monitoring of an open-close status of a fire hydrant.

BRIEF SUMMARY

The disclosure provides for an adapter cap for a fire hydrant comprising a hydrant actuation nut by means of which the hydrant is opened and closed by rotating the hydrant actuation nut. The adapter cap comprises a cap housing comprising connection means for connecting the adapter cap to the hydrant actuation nut, the cap housing comprises a cap actuation nut by which the adapter cap may be engaged and the cap housing comprises a skirt part arranged to encircle at least a part of the connection means, wherein a connection means center axis of the connection means and a cap actuation nut center axis of the cap actuation nut are arranged coaxially. The connection means and the cap actuation nut are made from metal, and at least a part of the skirt part is made from a polymer material. The adapter cap further comprises at least one sensor arranged in the cap housing, wherein the at least one sensor is arranged to detect at least one operational parameter of the hydrant, and wireless communication means arranged in the cap housing for communicating the at least one operational parameter wirelessly to an external data system.

Some fire hydrants are very rarely opened so when they need to be opened it might take a relatively large torque to rotate the hydrant actuation nut of the hydrant. Firemen are therefore equipped with a relatively large key enabling that much torque can be applied. When the hydrant actuation nut is provided with an adaptor cap it is therefore important that the torque can be transferred from the cap actuation nut to the connection means and further on to the hydrant actuation nut without the adaptor cap breaking. Thus, it is advantageous to make the connection means and the cap actuation nut from metal. However, metal will also block signals from wireless communication means arranged in the adaptor cap and it is therefore advantageous to make the skirt part from a polymer material in that a polymer material will allow signals from wireless communication means to pass and thus at the same time allow that the wireless communication means be located in the protected environment inside the cap housing.

It should be noted that in this context the term "wireless communication means" includes any kind of wireless communicator capable of communicating the at least one operational parameter wirelessly to an external data system. I.e. the term comprises any kind data transmitter, signal sender, signal communicator or other.

Further, it should be noted that in this context the term "connection means" includes any kind of connector capable of rigidly connecting the adaptor cap to the hydrant actuation nut. I.e. the term comprises any kind of interlocking geometry, clamping device, wedging device, screws, bolts, rivets, adhesive or other or any combination thereof.

In an aspect of the disclosure, the at least one sensor comprises an at least one open-close sensor arranged to detect the open-close status of the hydrant which is advantageous in that the adaptor cap hereby can be used to monitor use of the hydrant. The open-close sensor could e.g. comprise a capacitive sensor, an inductive sensor, a radar sensor, an ultrasound sensor, a photo optic sensor or other arranged to detect rotation of the adaptor cap in relation to the hydrant by the open-close sensor detecting passing indentations or other variations in the surface of the hydrant, by detecting color variation, by detecting variation in magnetic fields or other that would enable the open-close sensor to detect rotation of the adaptor cap in relation to the hydrant.

In an aspect of the disclosure, the at least one sensor comprises an accelerometer and/or a temperature sensor.

Providing the adaptor cap with an accelerometer is advantageous in that it hereby is possible to detect vandalism or to detect that the hydrant has been run down or otherwise damaged.

Providing the adaptor cap with a temperature sensor is advantageous in that it enables that the temperature of the hydrant can be monitored to e.g. compensate the determined open-close position in relation to very high or low temperatures to achieve a more precise determination of the actual position of the blocking element. Furthermore, the hydrants are often located along existing infrastructure e.g. in or along the roads in a city. Thus, it is advantageous to also make the sensor system comprises a temperature sensor in that the distributed hydrants with adaptor caps hereby also could be used to monitor road temperatures and/or provide more precise local temperatures.

In an aspect of the disclosure, the connection means comprises an aperture adapted to geometrically engage the hydrant actuation nut.

Forming the connection means with an aperture that will geometrically engage the hydrant actuation nut is advantageous in that the geometrically engaging structures will ensure that the torque will be efficiently transferred. The geometrically engaging structures can then e.g. be supplemented by a screw or a bolt ensuring that the geometrically engaging structures remain geometrically engaged at all times.

In an aspect of the disclosure, the connection means comprises an aperture adapted to be positively connected to the hydrant actuation nut.

Forming the connection means with an aperture that is positively connected to the hydrant actuation nut in relation to rotation is advantageous in that the positively connected structures will ensure that the torque will be efficiently transferred. The positively connected structures can then e.g. be supplemented by a screw or a bolt ensuring that the positively connected structures remain positively connected at all times.

In an aspect of the disclosure, the connection means center axis and the cap actuation nut center axis are arranged to be arranged coaxially with a hydrant actuation nut center axis of the hydrant actuation nut when the adapter cap is connected to the hydrant actuation nut.

Arranging the connection means center axis, the cap actuation nut center axis and the hydrant actuation nut center axis coaxially is advantageous in that aligning these center axes ensures that the rotational axes are aligned, thereby ensuring simple opening and closing of the hydrant by means of the adaptor cap.

In an aspect of the disclosure, the polymer material is plastic.

Plastic is an inexpensive material that is easy to form in the desired shape. And since plastic will allow signals to be transmitted substantially unrestricted through the skirt part it is advantageous to form the skirt part from plastic.

In an aspect of the disclosure, the metal is steel.

Steel is a strong, durable and relatively inexpensive material that is easy to machine or cast into the desired shape. Thus, steel is particularly suited for ensuring that the torque can be efficiently and safely transferred from the cap actuation nut to the connection means and further on to the hydrant actuation nut.

It should be noticed that in this context the term steel includes all variations of steel such as stainless steel, cast steel, steel alloys, tempered steel and other.

In an aspect of the disclosure, the metal is brass.

Brass is a relatively strong, durable and inexpensive material that is easy to machine or cast into the desired shape. Thus, brass is suited for ensuring that the torque can be efficiently and safely transferred from the cap actuation nut to the connection means and further on to the hydrant actuation nut.

In an aspect of the disclosure, the wireless communication means comprises an antenna.

Making the wireless communication means comprise an antenna is advantageous in that the antenna will enable long range wireless communication via e.g. WIFI, PSTN, SMSTP, IP, Sigfox, LoRa, NB-IoT, 3G, 4G, 5G or another communication protocol.

In an aspect of the disclosure, the antenna is a patch antenna.

Patch antennas—including variants such as shorted patch antennas, printed monopole antennas, microstrip antennas and planar inverted-F antennas—are particularly suited for this specific purpose because they are very efficient at transmitting signals and they are relatively easy to integrate in an adaptor cap.

In an aspect of the disclosure, the adapter cap further comprises a power unit for supplying electrical power at least to the at least one sensor and the wireless communication means.

The hydrants are often positioned at remote locations where it would be difficult or expensive to provide a power connection to an external power source—such as the grid—and it is therefore advantageous to provide the at least one sensor and the wireless communication means with their own power unit. Furthermore, an integrated power unit enables a simpler installation of the electronic in the adaptor cap.

It should be noted that in this context the term "power unit" includes any kind of power generator capable of generating and/or supplying electrical power. I.e. the term comprises any kind of battery, fuel cell, solar cell, generator driven by an internal combustion engine or other or any combination thereof.

In an aspect of the disclosure, at least the at least one sensor and the wireless communication means are formed as a single interconnected unit.

Arranging the sensor and wireless communication means—and/or additional electronic equipment such as a memory, power unit, processing means, interfaces or other—in a single coherent unit is advantageous in that this will simplify handling and installation.

In an aspect of the disclosure, at least the at least one sensor and the wireless communication means are embedded inside the adapter cap.

Embedding the at least one sensor and the wireless communication means—and/or additional electronic equipment such as a memory, power unit, processing means, interfaces or other—inside the adapter cap e.g. by embedding the components is resin, plastic, rubber or another material suited for fully or substantially fully enclosing the components in the adaptor cap is advantageous in that the components are hereby better protected both against the environment by also against tampering.

In an aspect of the disclosure, at least the at least one sensor and the wireless communication means are embedded in a cavity between the skirt part and the connection means.

Embedding the electronic components in the cavity between the skirt part and the connection means is advantageous in that the sensitive electronic components is thus protected by both the embedding material and the skirt part. Furthermore, this cavity is furthermore advantageous in that it provides easy access to transmitting signal through the skirt part and for the sensors to detect operational parameter both inwards and outwards—i.e. both e.g. external temperature and motion in relation to the hydrant (i.e. rotation).

In an aspect of the disclosure, the skirt part is arranged to enclose at least the longitudinal extend of the connection means.

Forming the skirt part so that it encloses the longitudinal extend of the connection means is advantageous in that the adaptor cap hereby can also act as a shield for shielding the hydrant actuation nut and the surrounding parts from ingress of water, impact stress, tampering and other.

In an aspect of the disclosure, the adapter cap comprises an open-close sensor system, the open-close sensor system comprising at least one reference part and at least one open-close sensor for detecting the reference part, wherein one of the reference part and the at least one open-close sensor comprises fixation means for being fixed to a hydrant housing of the hydrant and wherein the other of the reference part and the at least one open-close sensor is connected to the cap housing so that the reference part and the at least one open-close sensor is arranged to rotate in relation to each other if the adapter cap is rotated when being connected to the hydrant actuation nut and wherein the at least one reference part and the at least one open-close sensor are arranged so that the rotation angle and the direction of rotations of the adapter cap is detected by means of the at least one open close sensor.

Providing the adaptor cap with a reference part being fixed to the hydrant is advantageous in that more precise and reliable information regarding rotation of the adaptor cap in relation to the fixed hydrant housing hereby can be achieved.

It should be noted that in this context the term "reference part" includes anything that can be detected by a sensor. I.e. the term includes any kind of magnet, light emitting or absorbing device, a sound emitter, variations in geometry or color, holes in a surface or other or any combination thereof.

It should also be noted that in this context the term "fixation means" includes any kind of fixator capable of holding the reference part or the sensor in a fixed position. I.e. the term comprises any kind of screws, bolts, rivets, adhesive, interlocking geometry, clamping device or other or any combination thereof.

In an aspect of the disclosure, the reference part comprises a permanent magnet.

Permanent magnet requires no power source to work and are very reliable. Thus, using permanent magnet as reference part is advantageous—especially given the often remote location at which the adaptor cap has to be installed.

In an aspect of the disclosure, the cap actuation nut is extending from an outer surface of the cap housing.

Forming the cap actuation nut so that it extends from an outer surface of the cap housing is advantageous in that the cap actuation nut hereby is easy to identify and engage e.g. in case of a nearby fire.

The disclosure also provides for an adapter cap kit for a fire hydrant comprising a hydrant actuation nut by means of which the hydrant is opened and closed by rotating the hydrant actuation nut. The adapter cap kit comprises at least one reference part comprising fixation means for fixating the reference part to a hydrant housing of the hydrant and an adapter cap. The adaptor cap includes a cap housing comprising connection means for connecting the adapter cap to the hydrant actuation nut and the cap housing comprising a cap actuation nut by which the adapter cap may be engaged. The cap housing also comprises a skirt part arranged to encircle at least a part of the connection means, wherein a connection means center axis of the connection means and a cap actuation nut center axis of the cap actuation nut are arranged coaxially, wherein the connection means and the cap actuation nut are made from a metal, and wherein at least a part of the skirt part is made from a polymer material. The adaptor cap further includes at least one open-close sensor arranged in the cap housing for detecting the reference part and wireless communication means arranged in the cap housing for communicating data from the at least one open-close sensor wirelessly to an external data system.

Connecting the adaptor cap comprising the open-close sensor to the hydrant actuation nut and connecting the reference part to the hydrant housing is advantageous in that precise and reliable information regarding rotation of the adaptor cap in relation to the fixed hydrant housing hereby can be achieved. Furthermore, a dedicated reference part also enables that direction of rotation more easily can be detected.

In an aspect of the disclosure, the reference part and the at least one open-close sensor is arranged to rotate in relation to each other if the adapter cap is rotated which is advantageous in that precise and reliable information regarding rotation of the adaptor cap in relation to the fixed hydrant housing hereby can be achieved In an aspect of the disclosure, the at least one reference part and the at least one open-close sensor are arranged so that the rotation angle and the direction of rotations of the adapter cap is detected by means of the at least one open close sensor.

Detecting both the rotation angle and the direction of rotations of the adapter cap is advantageous in that it hereby is possible to detect if the hydrant is being closed or opened and how much it is opened or closed.

In an aspect of the disclosure, the adapter cap further comprises an accelerometer and/or a temperature sensor.

Providing the adaptor cap with an accelerometer is advantageous in that it hereby is possible to detect vandalism or to detect that the hydrant has been run down or otherwise damaged.

Providing the adaptor cap with a temperature sensor is advantageous in that it enables that the temperature of the hydrant can be monitored to e.g. compensate the determined open-close position in relation to very high or low temperatures to achieve a more precise determination of the actual position of the blocking element. Furthermore, the hydrants are often located along existing infrastructure e.g. in or along the roads in a city. Thus, it is advantageous to also make the sensor system comprises a temperature sensor in that the distributed hydrants with adaptor caps hereby also could be used to monitor road temperatures and/or provide more precise local temperatures.

In an aspect of the disclosure, the connection means comprises an aperture adapted to geometrically engage the hydrant actuation nut.

Forming the connection means with an aperture that will geometrically engage the hydrant actuation nut is advantageous in that the geometrically engaging structures will ensure that the torque will be efficiently transferred. The geometrically engaging structures can then e.g. be supplemented by a screw or a bolt ensuring that the geometrically engaging structures remain geometrically engaged at all times.

In an aspect of the disclosure, the connection means comprises an aperture adapted to be positively connected to the hydrant actuation nut.

Forming the connection means with an aperture that is positively connected to the hydrant actuation nut in relation to rotation is advantageous in that the positively connected structures will ensure that the torque will be efficiently transferred. The positively connected structures can then e.g. be supplemented by a screw or a bolt ensuring that the positively connected structures remain positively connected at all times.

In an aspect of the disclosure, the connection means center axis and the cap actuation nut center axis are arranged to be arranged coaxially with a hydrant actuation nut center axis of the hydrant actuation nut when the adapter cap kit is connected to the hydrant actuation nut.

Arranging the connection means center axis, the cap actuation nut center axis and the hydrant actuation nut center axis coaxially is advantageous in that aligning these center axes ensures that the rotational axes are aligned, thereby ensuring simple opening and closing of the hydrant by means of the adaptor cap.

In an aspect of the disclosure, the polymer material is plastic.

Plastic is an inexpensive material that is easy to form in the desired shape. And since plastic will allow signals to be transmitted substantially unrestricted through the skirt part it is advantageous to form the skirt part from plastic.

In an aspect of the disclosure, the metal is steel.

Steel is a strong, durable and relatively inexpensive material that is easy to machine or cast into the desired shape. Thus, steel is particularly suited for ensuring that the torque can be efficiently and safely transferred from the cap actuation nut to the connection means and further on to the hydrant actuation nut.

It should be noticed that in this context the term steel includes all variations of steel such as stainless steel, cast steel, steel alloys, tempered steel and other.

In an aspect of the disclosure, the metal is brass.

Brass is a relatively strong, durable and inexpensive material that is easy to machine or cast into the desired shape. Thus, brass is suited for ensuring that the torque can be efficiently and safely transferred from the cap actuation nut to the connection means and further on to the hydrant actuation nut.

In an aspect of the disclosure, the wireless communication means comprises an antenna.

Making the wireless communication means comprise an antenna is advantageous in that the antenna will enable long range wireless communication via e.g. WIFI, PSTN, SMSTP, IP, 3G, 4G, 5G, Sigfox, LoRa or another communication protocol.

In an aspect of the disclosure, the antenna is a patch antenna.

Patch antennas—including variants such as shorted patch antennas, printed monopole antennas, microstrip antennas and planar inverted-F antennas—are particularly suited for this specific purpose because they are very efficient at transmitting signals and they are relatively easy to integrate in an adaptor cap.

In an aspect of the disclosure, the adapter cap kit further comprises a power unit for supplying electrical power at least to the at least one sensor and the wireless communication means.

The hydrants are often positioned at remote locations where it would be difficult or expensive to provide a power connection to an external power source—such as the grid—and it is therefore advantageous to provide the at least one sensor and the wireless communication means with their own power unit. Furthermore, an integrated power unit enables a simpler installation of the electronic in the adaptor cap.

In an aspect of the disclosure, at least the at least one open-close sensor and the wireless communication means are formed as a single interconnected unit.

Arranging the sensor and wireless communication means—and/or additional electronic equipment such as a memory, power unit, processing means, interfaces or other—in a single coherent unit is advantageous in that this will simplify handling and installation.

In an aspect of the disclosure, at least the at least one sensor and the wireless communication means are embedded inside the adapter cap.

Embedding the at least one sensor and the wireless communication means—and/or additional electronic equipment such as a memory, power unit, processing means, interfaces or other—inside the adapter cap e.g. by embedding the components is resin, plastic, rubber or another material suited for fully or substantially fully enclosing the components in the adaptor cap is advantageous in that the components are hereby better protected both against the environment by also against tampering.

In an aspect of the disclosure, at least the at least one sensor and the wireless communication means are embedded in a cavity between the skirt part and the connection means.

Embedding the electronic components in the cavity between the skirt part and the connection means is advantageous in that the sensitive electronic components is thus protected by both the embedding material and the skirt part.

Furthermore, this cavity is furthermore advantageous in that it provides easy access to transmitting signal through the skirt part and for the sensors to detect operational parameter both inwards and outwards—i.e. both e.g. external temperature and motion in relation to the hydrant (i.e. rotation).

In an aspect of the disclosure, the skirt part is arranged to enclose at least the longitudinal extend of the connection means.

Forming the skit part so that it encloses the longitudinal extend of the connection means is advantageous in that the adaptor cap hereby can also act as a shield for shielding the hydrant actuation nut and the surrounding parts from ingress of water, impact stress, tampering and other.

In an aspect of the disclosure, the cap actuation nut is extending from an outer surface of the cap housing.

Forming the cap actuation nut so that it extends from an outer surface of the cap housing is advantageous in that the cap actuation nut hereby is easy to identify and engage e.g. in case of a nearby fire.

In an aspect of the disclosure, the at least one reference part comprises at least one permanent magnet.

Permanent magnet requires no power source to work and are very reliable. Thus, using permanent magnet as reference part is advantageous—especially given the often remote location at which the adaptor cap has to be installed.

In an aspect of the disclosure, the at least one open-close sensor comprises at least one Hall effect sensor.

Hall effect sensors are very reliable and only consumes very little power during operation and are therefore particularly suited as sensors in a sensor system to be used in an adaptor cap.

In an aspect of the disclosure, the at least one reference part comprises a first magnet and a second magnet arranged on opposite sides of the connection means center axis and so that the polarity of the first magnet and second magnet is opposite to each other in a direction parallel with the connection means center axis.

Forming the reference part by means of two permanent magnets arranged with opposite polarity in the direction of rotational axis of the operating device is advantageous on that a simple and reliable reference part hereby is formed enabling that different rotational positions may be identified.

In an aspect of the disclosure, the at least one open-close sensor comprises two sensors arranged in a mutual displacement angle of 90 degrees in a plane perpendicular to the connection means center axis.

Forming the sensor by means of two sensors spaced 90 degrees apart enables in a simple and reliable way that the rotational position can be determined with a 90 degree resolution and that the rotational direction can be determined in a simple and reliable manner by detecting the polarity of the magnet present under each of the two sensor.

In an aspect of the disclosure, the adapter cap further comprises a memory capable of storing reference positions.

Providing an adaptor cap with a memory which is capable of storing reference positions is advantageous in that this enables that the adaptor can be used for detecting the position of a blocking element in any kind of hydrant because the reference positions can be stored uniquely for any kind of hydrant and the actual position of the blocking element thereby determined simply by means of processing means on the basis of input from the at least one open-close sensor regarding rotation angle and the direction of rotations in relation to the stored reference position or positions.

It should also be noted that in this context the term "processing means" includes any kind of processor capable of determining a position of the blocking element based on a reference position and input from a sensor regarding rotation angle and the direction of rotations. I.e. the term includes any kind of microprocessor, logical circuit, programmable or hardwired logic controller, data processing system or other or any combination thereof.

In an aspect of the disclosure, the least one reference position comprises at least a first reference position corresponding to a position in which the blocking element is in one of a fully closed or a fully open position, and a second reference position corresponding to a position in which the blocking element is in the other of the fully closed or fully open position.

Storing the reference position corresponding to the position in which the blocking element is in a fully closed state, and the position in which the blocking element is in a fully open state is advantageous in that this enables a faster and more precise determination of the blocking element during use of the sensor system.

In an aspect of the disclosure, the connection means and the cap actuation nut are integrally formed from the same piece of metal.

Forming the connection means and the cap actuation nut monolithically from the same piece of metal is advantageous in that the ability to transfer torque is hereby increased.

The disclosure also relates to a fire hydrant comprising a hydrant actuation nut by means of which the hydrant is opened and closed by rotating the hydrant actuation nut around a hydrant actuation nut center axis. The fire hydrant also comprises an adapter cap being connected to the hydrant actuation nut by connection means and at least one sensor arranged in the adaptor cap, wherein the at least one sensor is arranged to detect at least one operational parameter of the hydrant. The fire hydrant further comprises wireless communication means arranged in the adaptor cap for communicating the at least one operational parameter wirelessly to an external data system.

Providing an adaptor cap with sensors and wireless communication means and connecting it to the hydrant actuation nut of the hydrant is advantageous in that is an simple and inexpensive way of detecting operational parameter of a hydrant to an extern location.

In an aspect of the disclosure, the adaptor cap is an adaptor cap according to any of the previously discussed adaptor caps.

The disclosure further relates to a fire hydrant comprising a hydrant actuation nut by means of which the hydrant is opened and closed by rotating the hydrant actuation nut around a hydrant actuation nut center axis, and an adapter cap kit comprising at least one reference part connected to the hydrant and an adapter cap. The adaptor cap includes a cap housing being connected to the hydrant actuation nut by connection means and at least one open-close sensor arranged in the cap housing for detecting the reference part. The adaptor cap also comprises wireless communication means arranged in the cap housing for communicating data from the at least one open-close sensor wirelessly to an external data system.

Connecting the adaptor cap comprising the open-close sensor to the hydrant actuation nut and connecting the reference part to the hydrant is advantageous in that precise and reliable information regarding rotation of the adaptor cap in relation to the fixed hydrant housing hereby can be achieved. Furthermore, a dedicated reference part also enables that direction of rotation more easily can be detected.

In an aspect of the disclosure, the cap housing comprises the connection means for connecting the adapter cap to the hydrant actuation nut.

Providing the cap housing with connection means for connecting the adapter cap to the hydrant actuation nut advantageous in that it hereby is ensured that torque can be efficiently transferred from the adaptor cap to the hydrant actuation nut.

In an aspect of the disclosure, the cap housing comprises a cap actuation nut by which the adapter cap may be engaged to rotate the hydrant actuation nut around a hydrant actuation nut center axis.

Providing the cap housing with a cap actuation nut is advantageous in that the adaptor cap hereby can be easily engaged—e.g. by the same tool normally used to engage the hydrant actuation nut—and thereby used for rotating the hydrant actuation nut by means of the adaptor cap.

In an aspect of the disclosure, the cap housing comprising a skirt part arranged to encircle at least a part of the connection means.

Forming the skit part so that it encloses the longitudinal extend of the connection means is advantageous in that the adaptor cap hereby can also act as a shield for shielding the hydrant actuation nut and the surrounding parts from ingress of water, impact stress, tampering and other.

In an aspect of the disclosure, a connection means center axis of the connection means and a cap actuation nut center axis of the cap actuation nut are arranged coaxially.

Arranging the connection means center axis and the cap actuation nut center axis coaxially is advantageous in that this enables simple operation of the adaptor cap and rigid transfer of torque through the adaptor cap.

In an aspect of the disclosure, the connection means and the cap actuation nut are made from a metal.

Forming the connection means and the cap actuation nut are made from metal is advantageous in that metal is strong and easy to machine to the desired shape ensuring efficient transfer of the torque through the adaptor cap.

In an aspect of the disclosure, at least a part of the skirt part is made from a polymer material.

Forming the skirt part in a polymer material is advantageous in that a polymer material will substantially not hinder signals transmitted from inside the skirt part by the wireless communication means to the external data system arranged distal to the adaptor cap.

In an aspect of the disclosure, the adapter cap kit is an adapter cap kit according to any of the previously discussed adaptor cap kits.

The disclosure also relates to a method for remote monitoring of an open-close status of a fire hydrant. The method comprises the steps of connecting an adapter cap to a hydrant actuation nut of the hydrant, wherein the adapter cap comprises at least one open-close sensor, connecting at least one reference part to a hydrant housing of the hydrant, detecting the open-close status of the fire hydrant by detecting rotation of the at least one open-close sensor in relation to the at least one reference part, and communicating the at open-close status wirelessly to an external data system.

Remote monitoring of the open-close status of a fire hydrant—i.e. if the hydrant is open or closed and how much it is opened and closed is advantageous in that it hereby is possible to detect tampering, to estimate the amount of water used e.g. for subsequent payment, to generally monitor hydrant usage and other. And by doing it by means of an adapter cap detecting a reference part on the hydrant is advantageous in that this enables simple and fast retrofitting on any type of hydrant.

In an aspect of the disclosure, the open-close status is compared to a threshold value in the external data system.

Comparing the detected status to a threshold value in the external data system is advantageous in that it hereby is possible to remotely detect the status and detect how much the hydrant is open.

In an aspect of the disclosure, the open-close status is detected and communicated to the external data system in response to a request send from the external data system to wireless communication means arranged to communicate the open-close status wirelessly from the at least one open-close sensor to the external data system.

Communicating wireless signals long range is power consuming and to aid in preserving the life of the power unit supplying power to the wireless communication means it is advantageous that the open-close status is communicated in response to a request.

In an aspect of the disclosure, the open-close status is automatically communicated to the external data system when the status change.

Arranging the adaptor cap to automatically communicated to the external data system when the status change is advantageous in that power consumption is hereby reduced.

In an aspect of the disclosure, the method is performed by means of a fire hydrant according to any of the previously discussed fire hydrants.

The disclosure furthermore relates to method for determining a position of a blocking element in a fire hydrant comprising a hydrant actuation nut configured so that the blocking element moves between an open and a closed position in dependency of the direction in which the hydrant actuation nut is rotated. The method comprises the steps of:
  connecting at least one open-close sensor to the hydrant actuation nut and connecting a reference part to a hydrant housing of the hydrant, so that the at least one open-close sensor detects the rotation angle of the hydrant actuation nut and the rotational direction of the rotations,
  calibrating the at least one open-close sensor by
    rotating the hydrant actuation nut in a first direction until the blocking element reaches a first reference position in which the blocking element is in a fully closed or a fully open position,
    storing the first reference position as the fully closed or the fully open position in a memory,
    rotating the hydrant actuation nut in a second direction opposite the first direction until the blocking element performs a calibration stroke and reaches a second reference position of the fully closed or fully open position,
    storing the second reference position as the fully closed or the fully open position in the memory,
  rotating the hydrant actuation nut while detecting the rotation angle of the hydrant actuation nut and the rotational direction of the rotations by means of the at least one open-close sensor, and
  determining the position of the blocking element based on the detected rotation angle and the detected rotational direction in relation to the first reference position and the second reference position.

Calibrating the open-close sensor by storing the extreme positions (i.e. the fully closed and the fully open position) in a memory and then determine the actual position of the blocking element in the hydrant by detecting the rotation angle and rotational direction of the hydrant actuation nut in relation to the stored extreme positions is advantageous in that this method then enables that the sensor system can be used to determine the open/close status of any type of hydrant no matter how many rotations is needed to move the blocking element between the fully closed and the fully open position on that specific hydrant. Thus, by means of this method the open-close sensor can be used efficiently on any hydrant and can easily be retrofitted on any hydrant no matter its make or model.

It should be noted that in this context the term "detecting the rotation angle of the hydrant actuation nut" includes that not only is the angular position detected but also that this done so that the number of rotations of the hydrant actuation nut is also detected. I.e. the term is not limited to only detecting angles between 0 and 360 degrees but includes continuous detection of angles between e.g. 0 and 2,000 degrees or another range depending on the number of rotations needed to move the blocking element between a fully closed or a fully open position or vice versa. And by continuously is not necessarily meant that all angular positions are detected accurately. The term also includes determining the rotation angle in increments e.g. with a resolution of 10 degrees, 45 degrees, 90 degrees, 180 degrees or even 360 degrees so that only every full rotation was detected.

In an aspect of the disclosure, after having stored the second reference position, the calibration of the at least one open-close sensor further comprises the step of rotating the hydrant actuation nut in the first direction again until the blocking element performs a first additional stroke and reaches the first reference position again and verifying correct calibration if the detected rotation angle of the calibration stroke is substantially the same as the detected rotation angle of the first additional stroke.

During the calibration process the fully open and fully closed position is typically detected manually e.g. by feeling the increase in resistance when rotating the hydrant actuation nut—no matter if this is done manually or by actuator. However, particularly if the open-close sensor is retrofitted on an older hydrant, wear and tear can cause that resistance can be felt even if the blocking element is not in an extreme position. It is therefore advantageous to only verify correct calibration if the detected rotation angle of the calibration stroke is substantially the same as for the first additional stroke in that this will increase the chance of performing a correct calibration.

In an aspect of the disclosure, correct calibration is only verified if the at least one open-close sensor detects that the rotational direction of the calibration stroke is opposite the rotational direction of the first additional stroke.

Also detecting that the rotational direction of the calibration stroke is opposite the first additional stroke is advantageous in that this will reduce the risk of calibration errors e.g. if the fully open or fully closed position was store during rotation in the same direction by mistake.

In an aspect of the disclosure, after having stored the second reference position, the calibration of the at least one open-close sensor further comprises the step of rotating the hydrant actuation nut in the first direction again until the blocking element performs a first additional stroke and reaches the first reference position again where after the hydrant actuation nut is rotated in the second direction again until the blocking element performs a second additional stroke and reaches the second reference position again and verifying correct calibration if the detected rotation angle of two of the calibration stroke, the first additional stroke and the second additional stroke are substantially the same.

Only verifying correct calibration if two out of the three strokes are substantially identical is advantageous in that this will reduce the risk of calibration errors even if the open-close sensor is installed on an old hydrant where the resistance may vary much depending on rotational direction or may vary over a single stroke.

In an aspect of the disclosure, correct calibration is only verified if the at least one open-close sensor detects that the rotational direction of the calibration stroke and/or the second additional stroke is opposite the rotational direction of the first additional stroke.

Also detecting that the rotational direction of the calibration stroke and/or the second additional stroke is opposite the first additional stroke is advantageous in that this will reduce the risk of calibration errors e.g. if the fully open or fully closed position was store during rotation in the same direction by mistake.

In an aspect of the disclosure, the method further comprises the step of activating the at least one open-close sensor at least before storing the reference positions in response to an activation signal provided by an operator.

Once the open-close sensor and the rest of the system is on it will use electrical power to power the sensors, the memory, communication devises and other. It is therefore advantageous that the system comprises the option of first being activating when it is about to be used. Thereby power can be saved during storage, transport, mounting and other.

In an aspect of the disclosure, the first reference position and the second reference position are stored in response to a store signal provided by an operator.

Making an operator provide a store signal to the sensor system is advantageous in that this will reduce the complexity of the system and aid in monitoring that the calibration process runs without errors.

In an aspect of the disclosure, the activation signal and/or the store signal is communicated wirelessly from an external wireless communication device.

The actuation nut of a hydrant is often placed on top of the hydrant or a similar location at which it is not desirable to connect to the sensor system by means of a wire. Thus, it is safer and faster to communicate wirelessly with the sensor system.

In an aspect of the disclosure, the external wireless communication device is a mobile phone.

A mobile phone is typically readily available to an operator and communicating wirelessly with the sensor system by means of a mobile phone therefore provides simple and inexpensive means of communication.

The disclosure also provides for an adapter cap for a fire hydrant comprising a hydrant actuation nut by means of which the hydrant is opened and closed by rotating the hydrant actuation nut. The adapter cap comprises a cap housing comprising connection means for connecting the adapter cap to the hydrant actuation nut and the cap housing comprising a cap actuation nut extending from an outer surface of the cap housing, wherein a connection means center axis of the connection means and a cap actuation nut center axis of the cap actuation nut are arranged coaxially. The adaptor cap also comprises at least one sensor arranged in the cap housing, wherein the at least one sensor is arranged to detect at least one operational parameter of the hydrant, and wireless communication means arranged in the cap housing for communicating the at least one operational parameter wirelessly to an external data system.

Hereby is achieved an advantageous embodiment of the disclosure.

The disclosure also provides for a fire hydrant comprising a hydrant actuation nut by means of which the hydrant is opened and closed by rotating the hydrant actuation nut around a hydrant actuation nut center axis and an adapter cap being connected to the hydrant actuation nut by connection means. The hydrant also comprises at least one sensor arranged in the adaptor cap, wherein the at least one sensor is arranged to detect at least one operational parameter of the hydrant and wireless communication means arranged in the adaptor cap for communicating the at least one operational parameter wirelessly to an external data system.

Hereby is achieved an advantageous embodiment of the disclosure.

In an aspect of the disclosure, the adaptor cap is an adaptor cap according to any of the previously discussed adaptor caps.

Further the disclosure provides for a method for remote monitoring of at least one operational parameter of a fire hydrant. The method comprises the steps of connecting an adapter cap to a hydrant actuation nut of the hydrant, detecting at least one operational parameter of the hydrant by means of the adapter cap, communicating the at least one operational parameter wirelessly to an external data system.

In an aspect of the disclosure, detecting at least one operational parameter of the hydrant comprises the step of detecting a hydrant open-close status of the hydrant.

In an aspect of the disclosure, detecting at least one operational parameter of the hydrant comprises the step of detecting a motion status of the hydrant.

In an aspect of the disclosure, the at least one operational parameter is compared to a threshold value in the external data system.

In an aspect of the disclosure, the at least one operational parameter is detected and communicated to the external data system in response to a request send from the external data system to wireless operational parameter communication means arranged to communicate the at least one operational parameter wirelessly from the adaptor cap to the external data system.

In an aspect of the disclosure, the method is performed by means of a hydrant according to according to any of the previously discussed hydrants.

Even further the disclosure provides for use of an adapter cap according to any of the previously discussed adapter caps for detecting an open-close status of a fire hydrant.

FIGURES

An embodiment of the disclosure will be described, by way of non-limiting example, in the following with reference to the figures in which.

DETAILED DESCRIPTION

Figure 1:
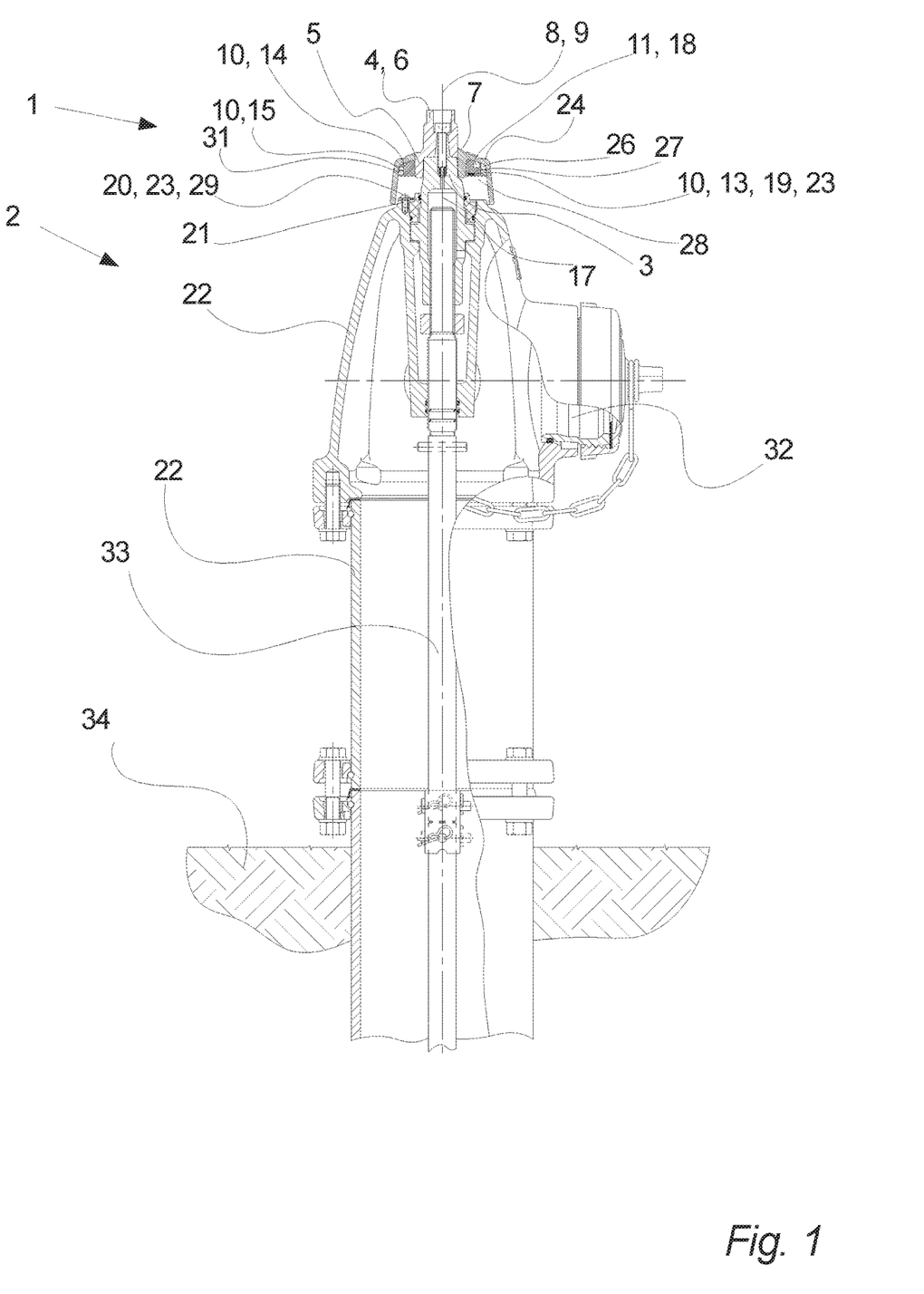
FIG. 1 illustrates the top part of a hydrant comprising an adaptor cap, as seen from the side.

FIG. 1 illustrates the top part of a hydrant 2 comprising an adaptor cap 1, as seen from the side.

The fire hydrant 2 is designed such that it may be operated from above ground 34 so that firefighters may easily obtain access to the water supply by attaching a fire hose to the water outlet 32.

As seen on the figure, the fire hydrant 2 is a relatively standard hydrant comprising a hydrant housing 22 in which an actuation rod 33 extends down and towards a blocking element 25 (see FIG. 2), so that the flow of water from the water supply lines and up to the hydrant 2 may be regulated depending on the position of the blocking element 25. In this embodiment the hydrant actuation nut 3 is extending downwards and is engaging the actuation rod 33 through a threaded connection so that when the hydrant actuation nut 3 is rotated, the actuation rod 33 is pushed downwards or pulled upwards depending on the direction of rotation. I.e. in this embodiment, the fire hydrant is a dry barrel hydrant in that the area between the blocking element 25 and the water outlet 32 is normally not filled with water (and therefore dry). However, in another embodiment, the fire hydrant 2 could be a wet barrel hydrant where the hydrant is filled with water up to the water outlets 32 and each water outlet 32 can be operated individually.

When the hydrant actuation nut 3 is rotated the actuation rod 33 travels up and down so that the blocking element 25 (see FIG. 2) may travel up and down and thereby the flow of water into the upper part of the hydrant 2 may be adjusted.

In this embodiment the hydrant actuation nut 3 at the top of the hydrant 2 is provided with an adapter cap 1 also called a weather shield. The adaptor cap 1 is provided with connection means 5 so that it may engage the hydrant actuation nut 3. The connection means 5 is formed so that it corresponds to the shape of the hydrant actuation nut 3 so that it may directly engage the hydrant actuation nut 3 without any modifications, adapters or other. In this embodiment, the connection means 5 is formed as an aperture 16 in the metal part of the adapter cap 2. However, in another embodiment, the connection means 5 could be a separate part being connected to the cap actuation nut 6, e.g. by screwing it in or bolting it onto the cap actuation nut 6. In this embodiment the connection means 5 and the cap actuation nut 6 are formed from a single piece of stainless steel but in another embodiment the connection means 5 and the cap actuation nut 6 or at least one of the connection means 5 and the cap actuation nut 6 could be made from brass, bronze, another steel alloy, or other or any combination thereof. In this embodiment the connection means 5 comprises an aperture 16 adapted to geometrically engage the hydrant actuation nut 3 so that the adaptor cap is positively connected to the hydrant actuation nut 3 in relation to rotation. To also secure the adaptor cap 1 against axial displacement the adaptor cap 1 is in this embodiment also provided with a screw down the middle for axially fixating the adaptor cap 1 to the hydrant actuation nut 3 and thereby preventing that the adaptor cap 1 can be pulled of the hydrant actuation nut 3. However, in another embodiment axial displacement of the adaptor cap 1 could be hindered by axial engagement of the adaptor cap 1 and the hydrant actuation nut 3, by means of adhesive, rivet or in another way or any combination thereof.

In this embodiment the adaptor cap 1 comprises a cap housing 4 including the connection means 5, the cap actuation nut 6 and a skirt part 24 but in another embodiment the cap housing 4 could comprise fewer parts, some of the parts could be integrated with each other or the cap housing 4 could comprise more parts, such as a surface coating (e.g. vulcanized rubber), data or instruction plate, an interface, buttons or other.

In order to measure various operational parameters, the adapter cap 1 of this embodiment comprises an accelerometer 14 for measuring any movement and a temperature sensor 15 for measuring the temperature. The measured data may be communicated to the outside of the adapter cap 1 via the antenna 26 or it may be stored in the memory 27. The memory 27 could store certain amount of information so that the measured and stored data is sent out once every e.g. minute, hour, day, week or other. The adapter cap 1 further comprises a power unit 18 for providing the various electronics with the necessary power. The adapter cap 1 may also comprise other type of electronics such as a microphone, hygrometer, seismometer, camera or any other type of electronic device or instrument which may measure, capture or meter parameters such as humidity, vibrations, light, chemicals, gases or other.

Figure 2:
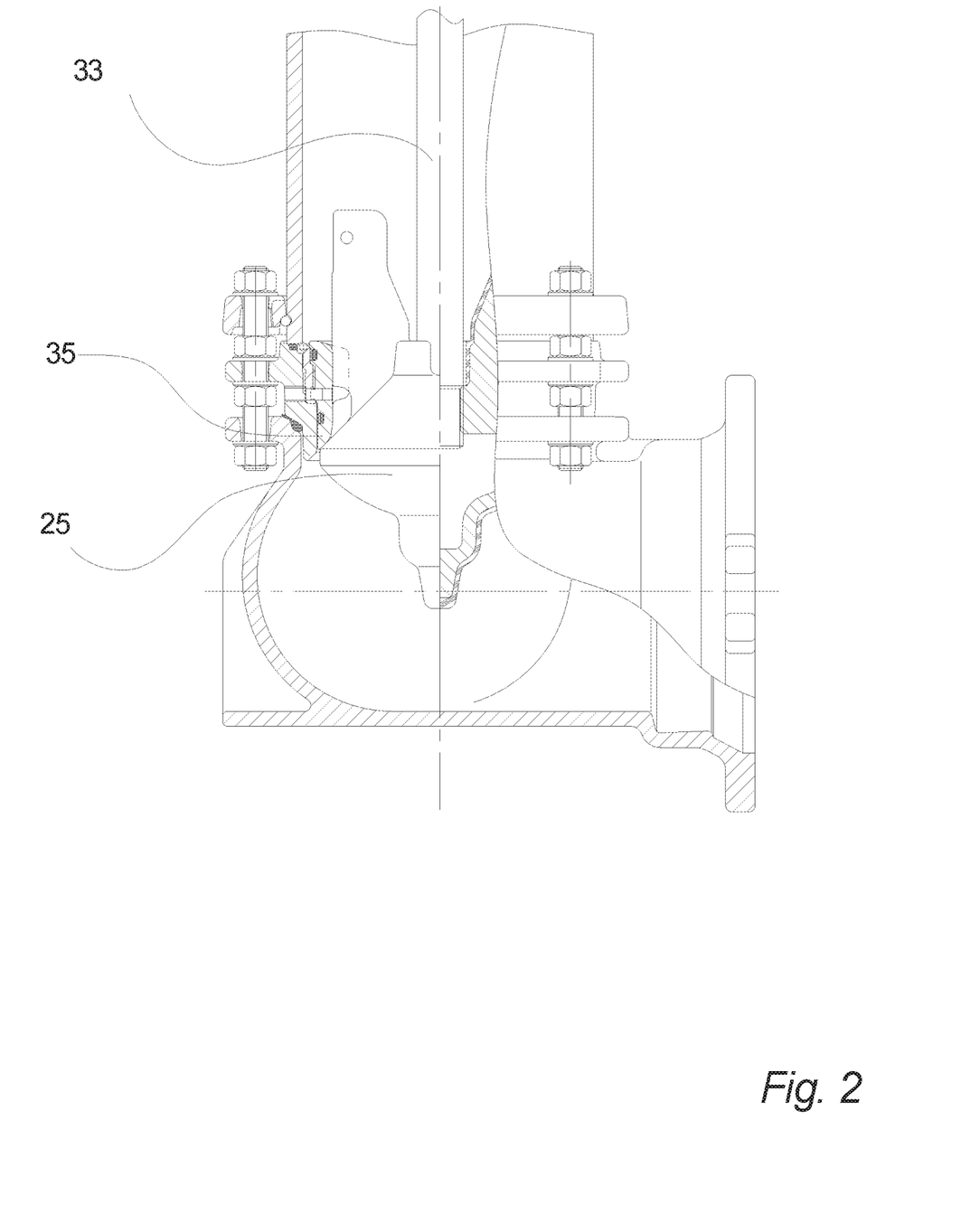
FIG. 2 illustrates the bottom part of a hydrant, as seen from the side.

FIG. 2 illustrates the bottom part of a hydrant 2, as seen from the side.

The bottom part of the hydrant 2 comprises the blocking element 25 which may be drawn up against a blocking element seat 35 so that the water from the water supply may not flow up through the hydrant 2. And if the blocking element 25 pushed downwards away from the blocking element seat 35, water is allowed to flow through and up through the upper part of the hydrant 2.

Figure 3:
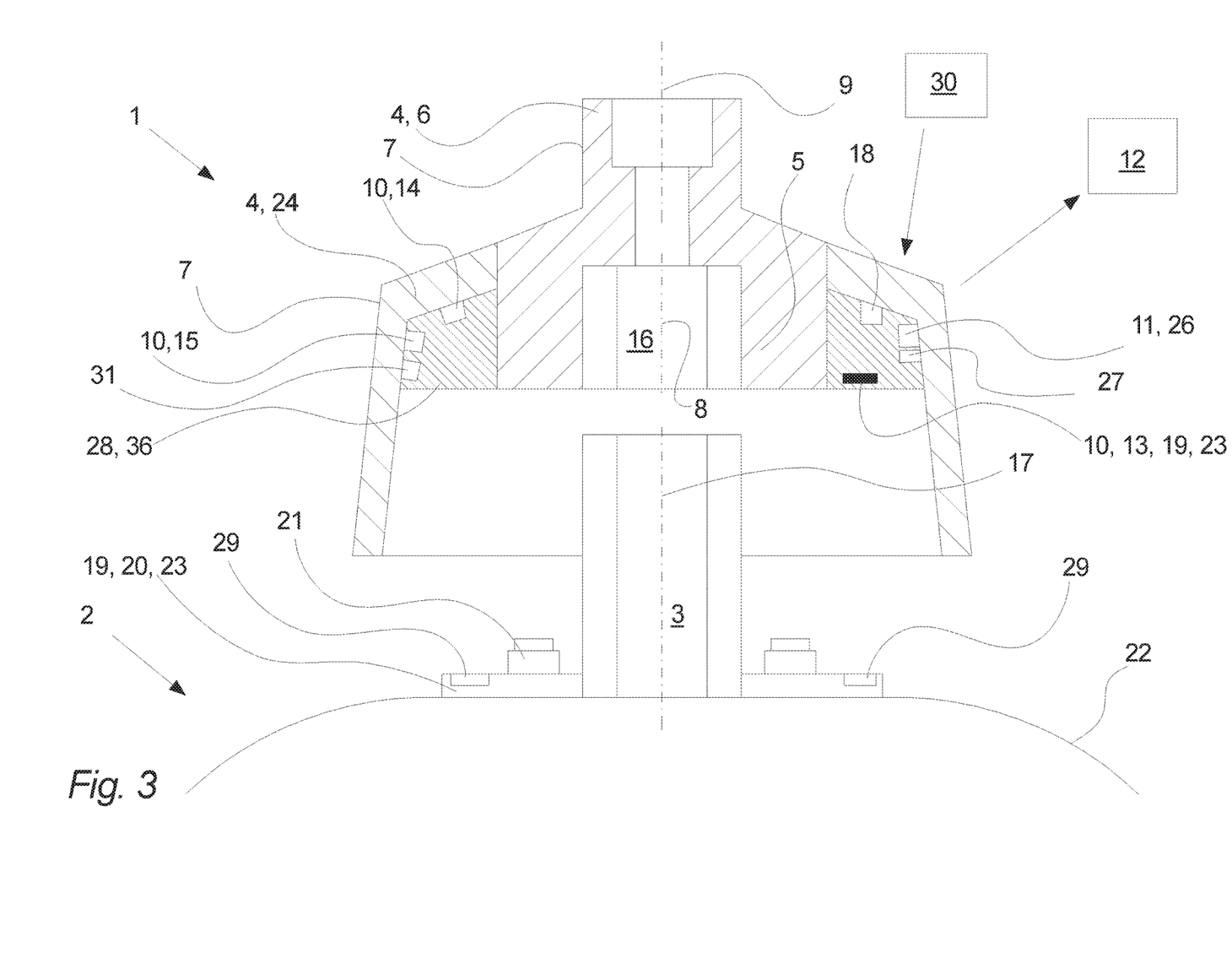
FIG. 3 illustrates a cross section through the middle of an adaptor cap kit being mounted on a hydrant, as seen from the side.

FIG. 3 illustrates a cross section through the middle of an adaptor cap kit 23 being mounted on a hydrant 2, as seen from the side.

In this embodiment of the disclosure the cap actuation nut 6 is formed so that it is an extending part, just as the hydrant actuation nut 3 is a part extending upwards, so that the same tool may be used both on the hydrant actuation nut 3 and the cap actuation nut 6. Thus, in this embodiment, both the hydrant actuation nut 3 and cap actuation nut 6 are formed so that they are extending upwards so that the same tool may be used to engage the nuts 3, 6. However, in another embodiment, they may both be formed as apertures or one of them may be formed as an aperture. The cap actuation nut 6 and the hydrant actuation nut 3 may be actuated by a dedicated key, a spanner, a socket wrench or other type of tool allowing for the operator (e.g. fireman) to rotate the nut 6 so that the actuation rod 33 rotates and thereby pushes the blocking element from a blocking element seat 35 whereby water flows up through the hydrant 2 and to the water outlet 32. In this embodiment the cap actuation nut center axis 9 is aligned with the connection means center axis 8 and the hydrant actuation nut center axis 17 so that it is easier to rotate the adapter cap 1. However, in another embodiment, the center axes 8, 9, 17 are not necessarily aligned or even parallel.

In this embodiment, the adapter cap 1 is designed with a skirt part 24 made of a polymer material so that the antenna 26 inside the adapter cap 1 may transmit information outside of the adapter cap 1 and to an external data system 12. The information to be transmitted via the antenna 24 to the external data system 12 could be accelerations (e.g. arising from movement of the adapter cap 1) as measured with accelerometer 14 and temperature as measured with temperature sensor 15. As mentioned earlier, any type of electronics could be positioned in the adapter cap 1. These electronics are powered by a power unit 18, which in this embodiment is a battery. However, in another embodiment, the power unit could be any other type of power unit as mentioned earlier. Also, in this embodiment, the electronics are embedded in an embedding material 36. The embedding material 36 could be rubber, resin, silicone, grout or other type of material or any combination thereof which allows for the electronics to be embedded into and mounted inside the adapter cap 1. However, in another embodiment, the electronics are mounted individually on the adapter cap 1 without the use of the embedding material 36. The electronics could be attached to the adapter cap 1 by gluing, soldering, screwing, clicked into dedicated holes or other type of attachment. In this embodiment the electronics 10, 11, 14, 15, 18, 26, 27, 31 is arranged in the cavity 28 formed between the connection means 5 and the upper part of the skirt part 24 so that the electronics 10, 11, 14, 15, 18, 26, 27, 31 are well-protected inside the cap 1. However, in another embodiment the electronics 10, 11, 14, 15, 18, 26, 27, 31 could be located elsewhere in or on the adaptor cap 1—i.e. in an embodiment at least some of the electronics 10, 11, 14, 15, 18, 26, 27, 31 could be cast into the skirt part 24 or arranged in a dedicated cavity of the cap actuation nut 6 or the hydrant actuation nut 3. In this embodiment the electronics 10, 11, 14, 15, 18, 26, 27, 31 are arranged at different locations in the cavity 28 and communicates with other electronics 10, 11, 14, 15, 18, 26, 27, 31 by wire or by being arranged on the same integrated circuit but in another embodiment at least some of the electronics 10, 11, 14, 15, 18, 26, 27, 31 could be formed as an integrated part—i.e. in another embodiment all or at least most of the electronics 10, 11, 14, 15, 18, 26, 27, 31 would be arranged on the circuit board designed to fit into the cavity.

In this embodiment the skirt part 24 is arranged down beneath the connection means so that when the adaptor cap 1 is mounted in its correct position on the hydrant actuation nut 3 the skirt part 24 extends almost down to the hydrant housing 22 whereby the adaptor cap will act as a weather shield protecting the hydrant actuation nut 3 against ingress of water, dirt, impact and other. However, in another embodiment the skirt part 24 could be arranged to protect an even larger part of the hydrant 2 or the skirt part 24 could be arranged to substantially only protect the open-close sensor 13 and the wireless communication means 11 and possibly other electronic parts.

In this embodiment the skirt part 24 is connected to the metal part (i.e. the cap actuation nut 6 and/or the connection means 5) of the adaptor cap 1 by means of adhesive. However, in another embodiment the skirt part 24 could also or instead be connected by being pulled down over the cap actuation nut 6 and the snapping into a dedicated recess in the connection means 5 to connect the skirt part 24 to the connection means 5 by interlocking geometry. However, in another embodiment the skirt part 24 could be connected to the cap actuation nut 6 and/or the connection means 5 by means of fixation means such as screws, bolts, rivets or other or any combinations of the connection methods.

When the actuation rod 33 moves the blocking element (not shown) up or down it is usually only possible to know the position of the blocking element in either of its extreme positions (i.e. fully closed or fully open) when the blocking element pushes against some kind of part which limits its travel. However, it may often be necessary to know how open the blocking element 25 is. Thus, in this embodiment, the adapter cap 1 is provided with an open-close sensor 13 arranged to detect a reference part 20 connected to the hydrant housing 22 by fixation means 21 which in this embodiment is bolts. However, in another embodiment the reference part 20 could be fixed in relation to the hydrant housing 22 by means of interlocking geometry, adhesive, rivets, screws or other or any combination thereof or the reference part 20 could be formed integrally with the hydrant 2. In this embodiment the reference part 20 comprising permanent magnet 21 so that e.g. the number of rotations and/or the direction of rotation may be counted and thereby estimate at which position the blocking element 25 is. In this embodiment the reference part 20 is formed by two permanent magnet parts 21 arranged so that they have opposite polarity in the direction of the rotational axis of the hydrant actuation nut 3 as will discussed in more details in relation to FIG. 4. I.e. in this embodiment the adaptor cap 1 and the reference part 20 together forms an adaptor cap kit 23 but in another embodiment the reference part 20 could be part of the adaptor cap 1.

In this embodiment, the open-close sensor 13 measures the change in magnetic field when it passes the permanent magnets 21. However, in another embodiment, the open-close sensor 13 could measure changes in surface texture such as grooves, holes, protrusions, color changes or in any other way keep track of the number of rotations by using an open-close sensor 13 and a reference part 20 or by a sensor 10 detecting this directly on the hydrant 2 without a reference part 20.

The information gathered by the electronics (number of rotations, direction of rotation, temperature, accelerations, humidity etc.) may be communicated to the external data system 12 via the wireless communication means 11, which in this embodiment comprises an antenna 26. In this embodiment, the antenna 26 is a patch antenna. However, in another embodiment, the antenna could be a dipole antenna, monopole antenna, loop antenna or any other type of antenna 26 for transmitting a signal.

However, in this embodiment the information gathered by the electronics 10, 14, 15, 18, 26, 27 are processed by the processing unit 31 mounted in the adapter cap 1 before being send to the external data system 12. However, in another embodiment, the information (or some of it) may also be directly transmitted to an external data system 12 and processed there. In this embodiment, the processing means 31 is a microprocessor but in another embodiment the processing means 31 could be any other type of processing means 31 as mentioned earlier. The external data system 12 could comprise cloud-computing where the processing means 31 or the software is in "a cloud" instead of being installed locally enabling that the transmitted data or results derived from the data may be accessed by any computer through the internet and/or dedicated software.

Usually an area such as a city comprises several fire hydrants 2 so that in case of fire there is always a nearby hydrant present for providing the firefighters with water for extinguishing the fire. However, a central monitoring station may be located far from some of the hydrants 2 which makes the data transmission distance relatively long. Thus, instead of transmitting data from each hydrant 2 to the station via the external data system 12, it is possible to transmit data the data to the external data system 12 via a short-range wireless communication protocol from hydrant 2 to hydrant 2 so that only the hydrant 2 closest to the external data system 12 transmits the signal over a long distance. In may also be possible to transmit the information to the external data system 12 via a repeater, a concentrator or other device for long distance transmittal of a signal. Communication networks could be WIFI, Sigfox, LoRa or another communication protocol.

Figures 4, 5:
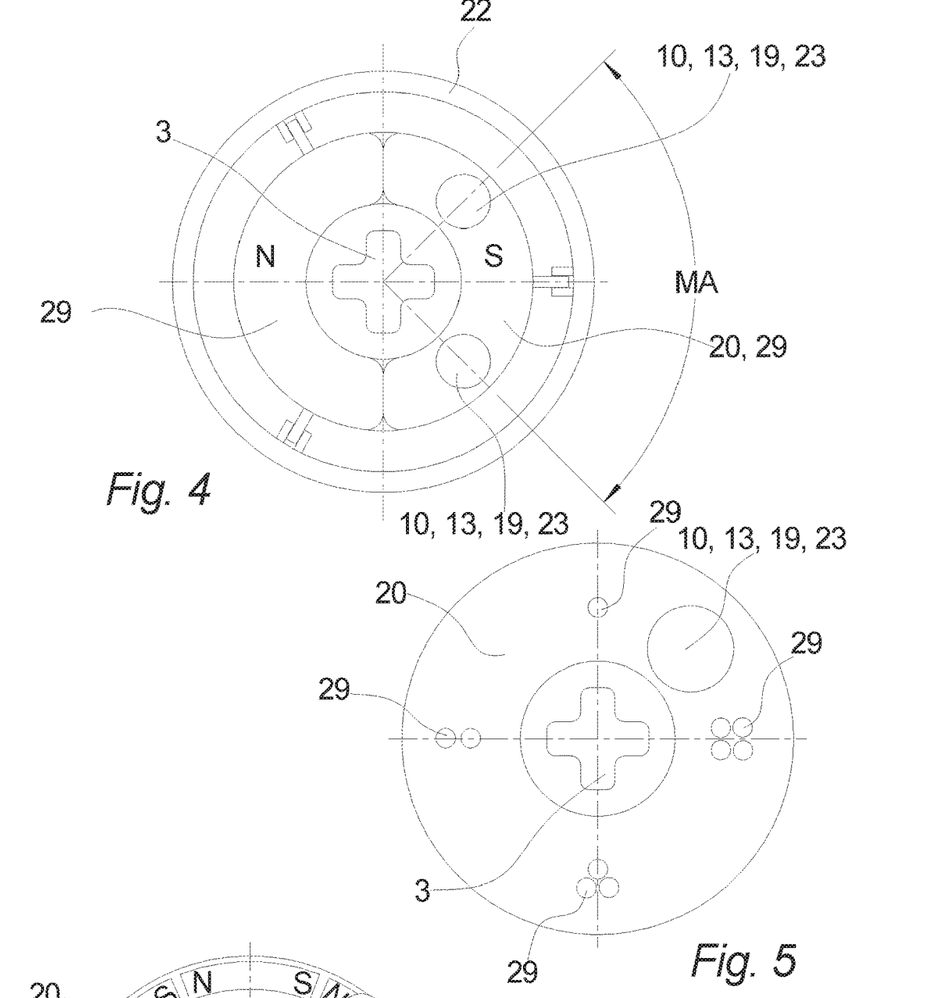
FIG. 4 illustrates two open-close sensors and a reference part, as seen from the top.
FIG. 5 illustrates a sensor system comprising one sensor, as seen from the top.

In this embodiment the open-close sensor 13 is actually two sensors spaced 90 degrees apart as discussed in relation to FIG. 4. In FIG. 3 only one of these two sensors 13 are visible. However, in another embodiment the sensor 13 could only comprise a single sensor, three sensors, four sensors or even more separate or integrated sensors.

In this embodiment the open-close sensor 13 is arranged to rotate directly over the reference part 20 so that the sensor 13 can detect different rotational positions by means of the reference part 20. However, in another embodiment the sensor 13 could be arranged to rotate under the reference part 20, outside the reference part 20 or inside the reference part 20 or vice versa.

In this embodiment the at least one open-close sensor 13 is arranged in relation to the reference part 20 so that the rotation angle and the direction of rotations of the adaptor cap 1 is detected by means of the at least one sensor 13 as will discussed further in relation to FIGS. 4 and 5.

In this embodiment the adaptor cap 1 further comprises a memory 27 which in this embodiment is arranged for storing at least one reference position. In this embodiment the wireless communication means 11 is also arranged for receiving a store signal which will activate storage of a reference position in the memory 27 in response to the store signal. In this embodiment the adaptor cap 1 also comprises processing means 31.

In this embodiment the wireless communication means 11 is also arranged to receive an activation signal which will active the sensors 10 and e.g. other electronic parts of the adaptor cap 1. During storage, handling, mounting etc. internal power from the power unit 18 to the sensors 10 and e.g. other parts is cut off by means of the processing means 31 to save power so that only the memory 27, wireless communication means 11 and at least parts of the processing means 31 will be powered. In response to receiving an activation signal from an external communication device 30 the processing means 31 will enable full power to all parts of the adaptor cap 1—when needed—and the adaptor cap will be in full operating mode. However, in another embodiment more, less or other components could be without power until the activation signal is provided and/or the adaptor cap 1 could comprise more than one activation state so that the activation signal would enable the adaptor cap 1 enter normal operation mode but a power saving signal would enable the adaptor cap 1 to enter power saving mode. Also, in another embodiment a close down signal would enable a full shut down of the adaptor cap 1 or other signal and modes could be included.

In this embodiment the activation signal is received wirelessly from an external communication device 30 in the form of a mobile phone communicating wirelessly with the wireless communication means 11 but in another embodiment the activation signal could be received through a wired arrangement, through the push of a button on the adaptor cap 1, through a user interface integrated in the adaptor cap 1, through a remote control or another way. Or in another embodiment the adaptor cap 1 would be always on or the adaptor cap 1 would be activated by connecting the power unit 18 to the adaptor cap 1.

In this embodiment the processing means 31 is determining the actual position of the blocking element 25 on the basis of the at least one reference position stored in the memory 5 and current input from the at least one open-close sensor 13 regarding rotation angle and direction of rotations. I.e. by detecting the number of rotations (the rotation angle) and the direction of rotation the processing means 31 can determine the actual position of the blocking element 25 by determining how far the blocking element 25 has travelled from (i.e. in relation to) the at least one reference position.

In another embodiment the adaptor cap 1 could also comprises a position indicator for communicating the position of the blocking element 25 determined by the processing means 31 to a user. In another embodiment this could be done through a wireless position signal being send from the wireless communication means 11 to the external communication device 30 where the user can read the position on the interface of the external communication device 30. Communication with the external communication device 30 could be done by Bluetooth or the wireless communication could take place by means of Near-field communication (NFC), Zigbee or another wireless protocol.

However, in another embodiment the position indicator could also or instead include a dedicated display, a diode changing color in response to the detected position, other visual, audial or tactile indicators or it could be sent wirelessly to a cloud storage, to a central backend or other. I.e. in another embodiment the position indicator would also or instead comprise means for long range wireless communication via e.g. WIFI, Sigfox, LoRa or another communication protocol. In another embodiment of the disclosure the adaptor cap 1 would further comprise a relay unit or a repeater unit for receiving data from one or more other adaptor caps 1 and repeating it on to another adaptor caps 1, to a central unit, to a concentrator or other.

In another embodiment the power unit 18 could further be provided with a solar cell e.g. connected to or integrated in the skirt part 24 to provide power to the power unit 18. However, in another embodiment the adaptor cap 1 could also or instead be provided with a fuel cell, a generator or other means for providing electrical power to the electrical power consuming components of the adaptor cap 1. In another embodiment the adaptor cap 1 could also or instead be connected an external electrical power supply such as the electrical grid.

In this embodiment the open-close status of the fire hydrant 1 is remotely monitored by connecting the adapter cap 1 to the hydrant actuation nut 3 of the hydrant 2, wherein the adapter cap 1 comprises at least one open-close sensor 13 and connecting the at least one reference part 20 to the hydrant housing 22 of the hydrant 2. The open-close status of the fire hydrant 2 is detected by detecting rotation of the at least one open-close sensor 13 in relation to the at least one reference part 20 and communicating the at open-close status wirelessly to the external data system 12.

In an embodiment the adaptor cap 1 or adaptor cap kit 23 will have to be calibrated before the open-close status can be detected. This is done by connecting the adaptor cap 1 to the hydrant actuation nut 3 and rotating the adaptor cap 1 in a first direction until the blocking element 25 reaches a first reference position in which the blocking element 25 is in a fully closed or a fully open position. The adaptor cap 1 is typically manually operated by means of a dedicated key and the operator will feel when an extreme position has been reached through the resistance—i.e. the operator cannot turn the adaptor cap 1 any further in the same direction even if the operator tries harder. The operator (also called a user) will then provide a store signal to the adaptor cap 1 in response to which a first reference position is stored as a fully closed or a fully open position in the memory 27. In this embodiment the operator will know if the blocking element 25 is in the open or the closed position through visual indications at the adaptor cap or the hydrant 1 regarding which way to turn the adaptor cap 1 to open or close the hydrant 2 and the operator is therefore able to send information regarding if it is the open or the closed position that have been reached when sending the store signal. However, in another embodiment the operator would only send a store signal and the adaptor cap 1 would be able to detect if it is the closed or the open position based on the direction of rotation leading to that specific position. In this embodiment the store signal is provided by means of a dedicated application or program installed on the operator's mobile phone but as discussed above it could be provided in numerous other ways. Once the first position is stored as the open or closed position the operator now rotates the adaptor cap 1 in the opposite direction until the blocking element 25 performs a full calibration stroke and reaches the other extreme position—i.e. the second reference position corresponding to the other of the fully closed or fully open position. Obviously if the first reference position is the open position, the second position is the closed position and vice versa. The operator then provides a store signal to store this second reference position as the fully closed or the fully open position in the memory 27. The calibration procedure has now been finished and the adaptor cap 1 now knows in which position the blocking element 25 is in and how many rotations it takes to bring it in the opposite extreme position. Thus, when the adaptor cap 1 is rotated, the rotation angle of the adaptor cap 1 and the rotational direction of these rotations will be detected by the sensor 13, and the processing means 31 is thereby capable of determining the actual position of the blocking element 25 from the travelled rotation angle and the direction in relation to the stored first and second reference positions.

However, in another embodiment the calibration procedure could further comprise that after having stored the second reference position, the operator would rotate the adaptor cap 1 in the first direction again until the blocking element 25 performs a first additional stroke and reaches the first reference position again. Correct calibration would then only be verified if the detected rotation angle of the calibration stroke is substantially the same as the detected rotation angle of the first additional stroke. Correct calibration would be verified by sending a calibration verification signal to the external wireless communication device 30 so that the operator knowns that the adaptor cap 1 is correctly calibrated and ready for normal operation. If correct calibration would cannot be verified this will also be informed to the operator through the external wireless communication device 30 and the operator will have to redo the calibration procedure. However, in another embodiment correct/incorrect calibration could also or instead be communicated in the same way and by the same means as previously exemplified in relation to the position indicator.

In this embodiment the calibration verification signal is transmitted to the external wireless communication device 30 by means of the Bluetooth protocol but in another embodiment the adaptor cap 1 could comprise dedicated means for transmitting the calibration verification signal and the signal could be transmitted by means of another protocol as previously exemplified.

In another embodiment the correct calibration is also only verified if the sensors 13 detects that the rotational direction of the calibration stroke is opposite the rotational direction of the first additional stroke to reduce the risk of incorrect calibration.

In another embodiment the calibration procedure could further comprise that after having stored the second reference position, the calibration procedure further comprises rotating the adaptor cap 1 in the first direction again until the blocking element 25 performs a first additional stroke and reaches the first reference position again where after the adaptor cap 1 is rotated in the second direction again until the blocking element 25 performs a second additional stroke and reaches the second reference position again. Correct calibration would then only be verified if the detected rotation angle of two of the calibration stroke, the first additional stroke and the second additional stroke are substantially the same and if the sensors 13 detects that the rotational direction of the calibration stroke and/or the second additional stroke is opposite the rotational direction of the first additional stroke.

FIG. 4 illustrates a sensor system 19 comprising two open-close sensors 13 and a reference part 20, as seen from the top.

In this embodiment the adaptor cap 1 or adaptor cap kit 23 comprises a reference part including a disc formed by two permanent magnets 29. The first magnet has north facing upwards toward the sensors 13 and the second magnet has south facing upwards toward the sensors 13. However, in another embodiment the magnets could instead be arranged with the same polarity in the same direction but with different strength.

In this embodiment the adaptor cap 1 comprises two open-close sensors 13 spaced apart in a mutual displacement angle MA of 90 degrees. However, in another embodiment the mutual displacement angle MA could be smaller such as 75, 60, 45 degrees or even less or the mutual displacement angle MA could be bigger such as 120, 135, 180 degrees or even more. And/or the adaptor cap 1 could comprise another number of sensors 13 such as one, three, four or even more.

When the adaptor cap 1 with the sensors 13 rotate, one of the two sensors 13 will move from one of the two magnets 29 to the other of the two magnets and the change of polarity will be detected by this sensor 13. When it is known which of the two sensors detected the change in polarity, the direction of rotation is thereby also detected. And by tracking how many times each sensor detects a change in polarity (and in which order this happens) the rotation angle (i.e. the number of rotations) can thereby also be detected with a resolution of 90 degrees.

In this embodiment the sensors 13 are Hall effect sensors suited for detecting the change in polarity and the reference part 20 comprises magnets 29 but in another embodiment the sensors 13 could be inductive sensors where the reference part 20 where the first magnet part in FIG. 4 would be formed by a ferrous metal and the second magnet part in FIG. 4 would be formed by a nonferrous metal so that the inductive sensors would detect the change in metal.

FIG. 5 illustrates a sensor system 19 comprising one open-close sensor 13, as seen from the top.

In this embodiment the reference part 20 is formed by a disc comprising a magnet arrangement with a different number of permanent magnets 29 for different 90 degree positions. Thus, in this embodiment a single sensor 13 will be able to detect the rotation angle and the rotational direction by detecting the change in the size of the magnet field at different positions. In another embodiment of this principle the magnet 29 would be formed more or less continuous but with increasing magnetic field so that the resolution was improved and there would be no "dead positions" where the sensor 13 would not detect a magnet.

Figure 6:
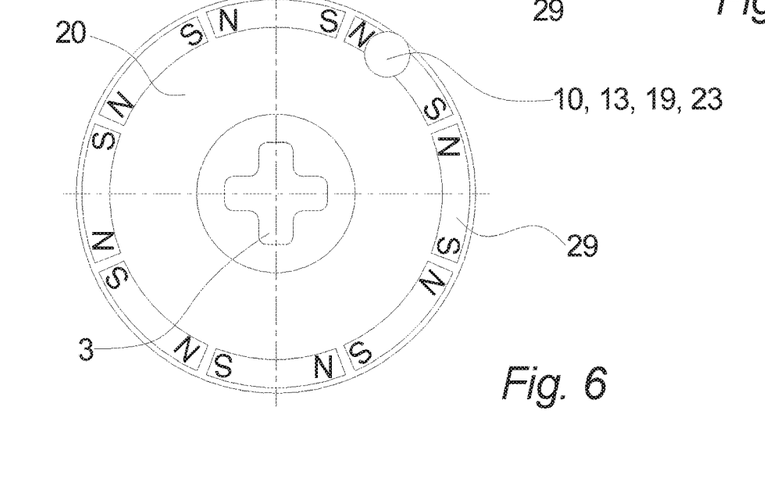
FIG. 6 illustrates a sensor system comprising one sensor and multiple magnets, as seen from the top.

FIG. 6 illustrates a sensor system 19 comprising one sensor 13 and multiple magnets 29, as seen from the top.

In this embodiment the reference part 20 comprises a number of magnets 29 arranged substantially end to end with north facing in the same rotational direction for all the magnets 29. Thus, when the sensor 13 rotates with the adaptor cap 1 the direction of rotation can be detected by the sensor 13 by monitoring if the change in polarity happens gradually—when passing over the same magnet—or whether it happens abruptly when passing over a neighboring magnet. The resolution of the detected rotation angle will be defined by the number of magnet and in this embodiment the resolution is therefore 45 degrees.

In relation to FIGS. 4, 5 and 6 different specific embodiments of open close sensors 13 and reference parts 20 have been discussed. However, the skilled person would know that the rotation angle and direction could be detected in numerous other ways. E.g. in another embodiment the sensors 13 and reference parts 20 could also or instead be formed as a rotary encoder system where the sensor 13 was a photocell arranged to detect holes in a rotating disc forming the reference part e.g. with increasing hole size to detect direction or the rotation angle and direction could be detected by means of a potentiometer system, a tachometer or other.

Figure 7:
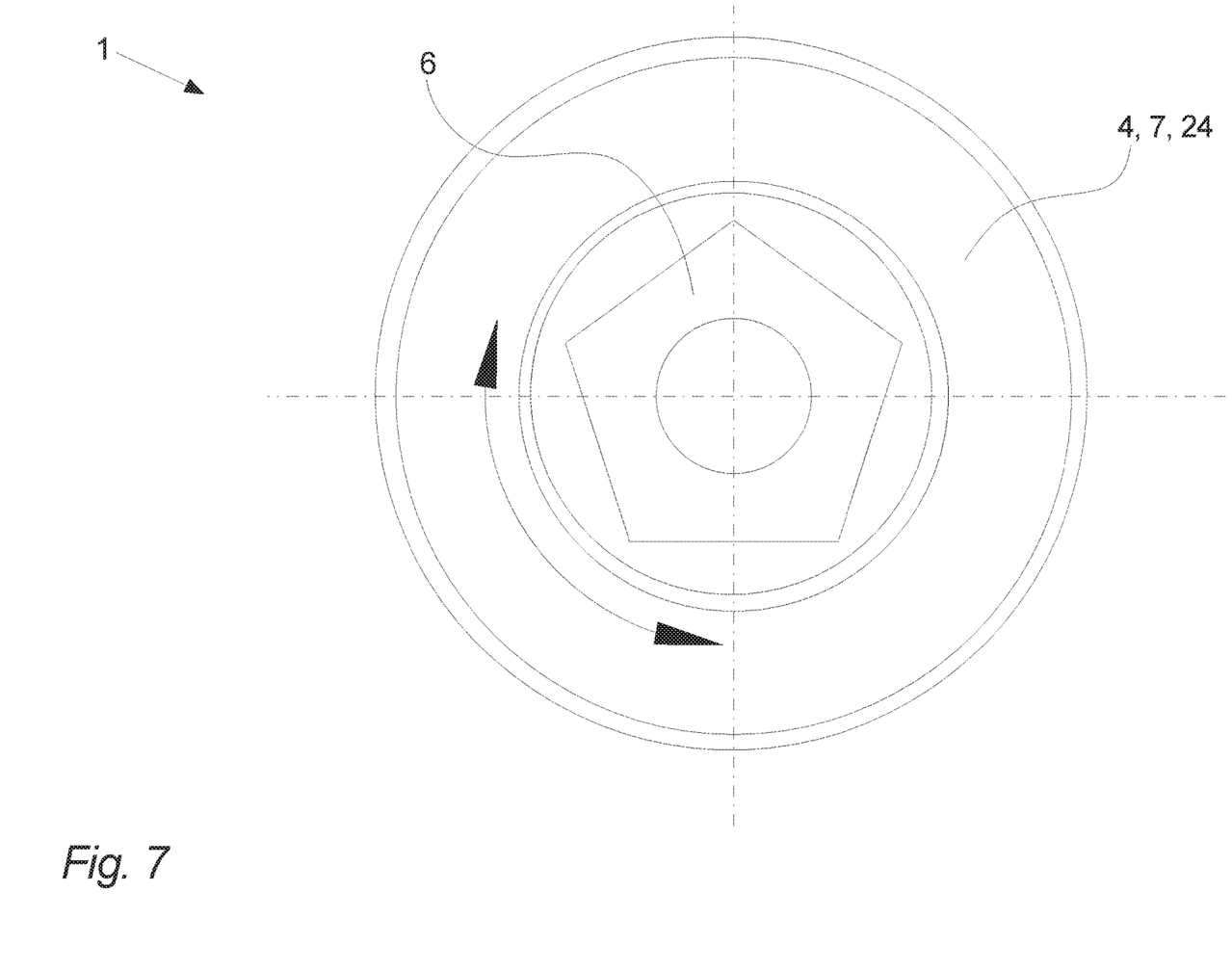
FIG. 7 illustrates an adaptor cap, as seen from the top.

FIG. 7 illustrates an adaptor cap 1, as seen from the top.

In this embodiment the adaptor cap 1 is provided with an arrow indicating that the adaptor cap is to be turned. In an embodiment the cap 1 would also comprise text explain which way the adaptor cap 1 is to be turned to open the hydrant 2 and which way it is to be turned to close the hydrant 2.

The disclosure has been exemplified above with reference to specific examples of adaptor caps 1, hydrants 2, sensors 10 and other. However, it should be understood that the disclosure is not limited to the particular examples described above but may be designed and altered in a multitude of varieties within the scope of the disclosure as specified in the claims.

The invention claimed is:

1. A method for remote monitoring of an open-close status of a fire hydrant, said method comprising the steps of:
    connecting an adapter cap to a hydrant actuation nut of said hydrant, wherein said adapter cap comprises at least one open-close sensor,
    connecting at least one reference part to a hydrant housing of said hydrant,
    detecting the open-close status of said fire hydrant by detecting rotation of said at least one open-close sensor in relation to said at least one reference part, and
    communicating said open-close status wirelessly to an external data system by means of a wireless communicator comprising a patch antenna
    wherein said open-close status is detected and communicated to said external data system in response to a request sent from said external data system to the wireless communicator arranged to communicate said open-close status wirelessly from said at least one open-close sensor to said external data system.

2. The method according to claim 1, wherein said open-close status is compared to a threshold value in said external data system.

3. An adapter cap kit for a fire hydrant comprising a hydrant actuation nut by way of which said hydrant is opened and closed by rotating said hydrant actuation nut, said adapter cap kit comprising:
    at least one reference part comprising a fixator for fixating said reference part to a hydrant housing of said hydrant, and
    an adapter cap, including
        a cap housing comprising a connector for connecting said adapter cap to said hydrant actuation nut, said cap housing comprising a cap actuation nut by which said adapter cap may be engaged, and said cap housing comprising a skirt part arranged to encircle at least a part of said connector, wherein a connector centre axis of said connector and a cap actuation nut centre axis of said cap actuation nut are arranged coaxially, wherein said connector and said cap actuation nut are made from a metal, and wherein at least a part of said skirt part is made from a polymer material,
        at least one open-close sensor arranged in said cap housing for detecting said reference part, and
        a wireless communicator arranged in said cap housing for communicating data from said at least one open-close sensor wirelessly to an external data system;
        wherein said wireless communicator comprises an antenna and wherein said antenna is a patch antenna.

4. The adapter cap kit according to claim 3, wherein said reference part and said at least one open-close sensor are arranged to rotate in relation to each other if said adapter cap is rotated.

5. The adapter cap kit according to claim 3, wherein said at least one reference part and said at least one open-close sensor are arranged so that the rotation angle and the direction of rotations of said adapter cap is detected by way of said at least one open-close sensor.

6. The adapter cap kit according to claim 3, wherein said adapter cap further comprises an accelerometer and/or a temperature sensor.

7. The adapter cap kit according to claim 3, wherein said connector comprises an aperture adapted to geometrically engage said hydrant actuation nut and/or wherein said connector comprises an aperture adapted to be positively connected to said hydrant actuation nut.

8. The adapter cap kit according to claim 3, wherein said connector centre axis and said cap actuation nut centre axis are arranged to be arranged coaxially with a hydrant actuation nut centre axis of said hydrant actuation nut when said adapter cap kit is connected to said hydrant actuation nut.

9. The adapter cap kit according to claim 3, wherein said polymer material is plastic.

10. The adapter cap kit according to claim 3, wherein said metal is steel or brass.

11. The adapter cap kit according to claim 3, wherein said adapter cap kit further comprises a power unit for supplying electrical power at least to said at least one sensor and said wireless communicator.

12. The adapter cap kit according to claim 3, wherein at least said at least one open-close sensor and said wireless communicator are formed as a single interconnected unit.

13. The adapter cap kit according to claim 3, wherein at least said at least one open-close sensor and said wireless communicator are embedded inside said adapter cap.

14. The adapter cap kit according to claim 3, wherein at least said at least one open-close sensor and said wireless communicator are embedded in a cavity between said skirt part and said connector by an embedding material.

15. The adapter cap kit according to claim 3, wherein said skirt part is arranged to enclose at least the longitudinal extension of said connector.

16. The adapter cap kit according to claim 3, wherein said at least one reference part comprises a first magnet and a second magnet arranged on opposite sides of said connector centre axis and so that the polarity of said first magnet and second magnet is opposite to each other in a direction parallel with said connector centre axis.

17. The adapter cap kit according to claim 3, wherein said at least one open-close sensor comprises two sensors arranged in a mutual displacement angle of degrees in a plane perpendicular to said connector centre axis.

18. A fire hydrant comprising:
a hydrant actuation nut by way of which said hydrant is opened and closed by rotating said hydrant actuation nut around a hydrant actuation nut centre axis, and
an adapter cap kit according to claim 3.

* * * * *